United States Patent [19]
dit Dalmy

[11] 3,892,429
[45] July 1, 1975

[54] LOAD-CARRYING PUSH-CARRIAGE

[76] Inventor: Max Hercovici dit Dalmy, 2 Rue St. James, 92 Neuilly-sur-Seine, France

[22] Filed: Jan. 24, 1974

[21] Appl. No.: 436,121

[30] Foreign Application Priority Data
Jan. 24, 1973  France .............................. 73.02530

[52] U.S. Cl. ............................. 280/36 C; 280/41 C
[51] Int. Cl. .............................................. B62b 1/00
[58] Field of Search ............ 280/36 C, 41 C, 47.19, 280/47.24, 47.27, 47.13 R

[56] References Cited
UNITED STATES PATENTS

| | | | |
|---|---|---|---|
| 1,718,962 | 7/1929 | Kimball | 280/36 C |
| 2,901,261 | 8/1959 | Olvey | 280/47.19 |
| 2,930,629 | 3/1960 | Schnell | 280/150.5 |
| 3,052,484 | 9/1962 | Huffman | 280/47.19 |
| 3,112,042 | 11/1963 | Leshner | 280/36 C |
| 3,804,432 | 4/1974 | Lehrman | 280/36 C |

*Primary Examiner*—Robert R. Song
*Attorney, Agent, or Firm*—Eric P. Schellin

[57] ABSTRACT

A foldable load-carrying push-carriage of the type comprising two platforms pivoted together along a common side and two rollers rotatably mounted at opposite ends of said common side, the first of said platforms being provided with holding means for handling the push-carriage. The rollers are respectively mounted at the lower end of two cranked strips integral with the first platform and extending in parallel directions from said common edge downwardly and rearwardly on the side of the first platform opposed to the second platform.

3 Claims, 8 Drawing Figures

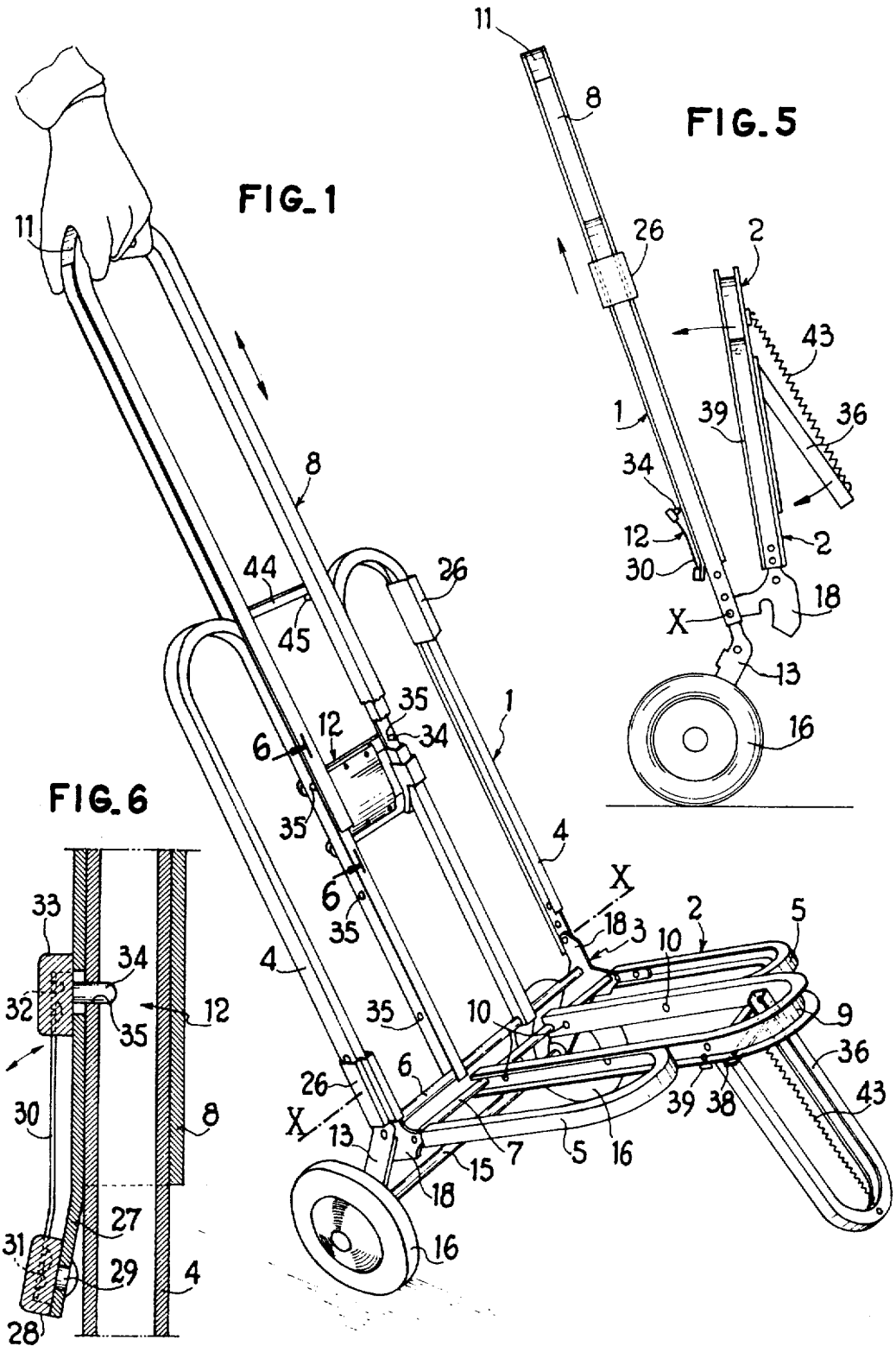

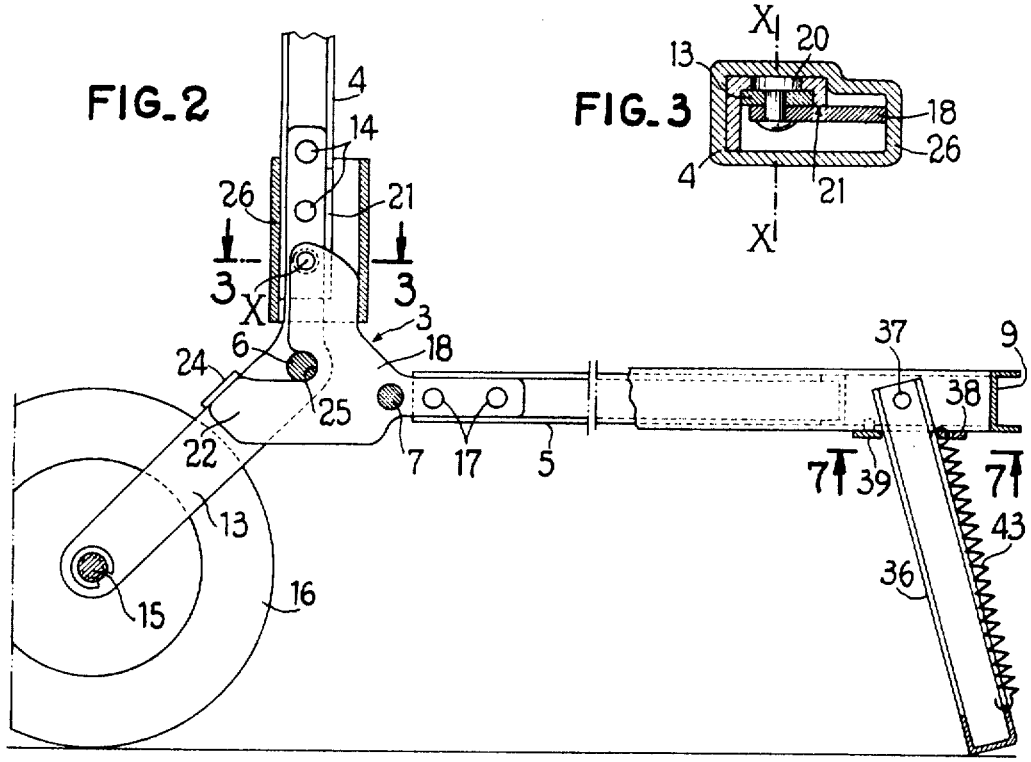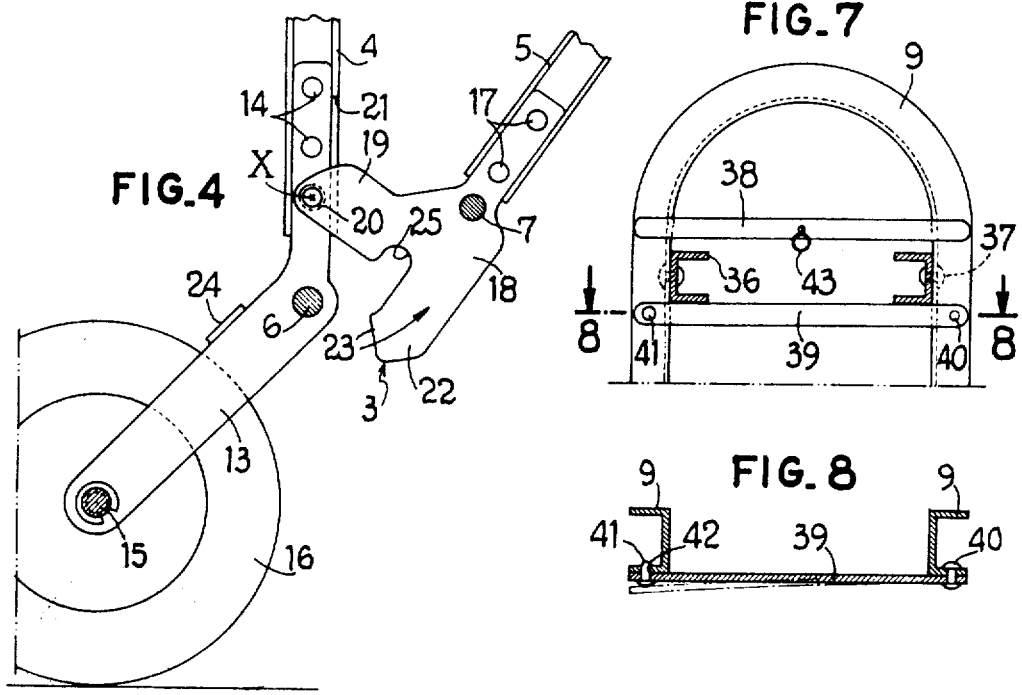

LOAD-CARRYING PUSH-CARRIAGE

The present invention relates to foldable load-carrying push-carriages of the type comprising two platforms pivoted together along a common edge and two wheels rotatably mounted at each end of the common edge, the first of the platforms being provided with holding means for handling the push-carriage.

An object of the invention is to provide such a push-carriage which is easier to handle than known push-carriages.

The invention provides a load-carrying push-carriage of the type defined hereinbefore, wherein said wheels are respectively mounted on lower end portions of two cranked strips which are integral with the first platform and extend in parallel directions from said common edge downwardly and rearwardly from the side of the first platform opposed to the second platform.

Owing to this feature, the push-carriage, even when heavily loaded, is much more easy to handle since the weight of the load is thus exerted vertically on the axis of rotation of the wheels in the position of use of the push-carriage.

Further features and advantages of the invention will be apparent from the ensuing description with reference to the accompanying drawings.

In the drawings:

FIG. 1 is a perspective view of a load-carrying push-carriage according to the invention in the position of use;

FIG. 2 is a side elevational view, partly in section, of the lower part of the push-carriage when it is resting in a stable position on the ground;

FIG. 3 is a sectional view, to an enlarged scale, taken on line 3—3 of FIG. 2;

FIG. 4 is a partial side elevational view, partly in section, of the lower part of the push-carriage in the course of folding up;

FIG. 5 is a side elevational view, to a smaller scale, of the push-carriage in the course of folding up;

FIG. 6 is a partial sectional view, to an enlarged scale, taken on line 6—6 of FIG. 1;

FIG. 7 is a plan view of a detail of the push-carriage and in particular of a stand which permits obtaining the stable position shown in FIG. 2, and FIG. 8 is a sectional view taken on line 8—8 of FIG. 7.

In the embodiment shown in the drawings, the load-carrying push-carriage according to the invention comprises two plates or platforms 1 and 2 which are interconnected to pivot about an axis X—X (FIG. 1), defined by their common edge, by means of a pivot device 3 which enables the push-carriage to be unfolded and folded up as shown in FIGS. 1 and 5 respectively.

Each of the platforms 1 and 2 is constructed from three arch-shaped members which are in adjoining relation in a plane, the outer members 4 and 5 of the platforms 1 and 2 being identical.

The outer members 4 of the platform 1 are interconnected by a transverse bar 6, preferably of steel, which is fixed to the free ends of each of the inner branches of these members, and a transverse bar or rod 7, also preferably of steel, interconnects in the same way the outer members 5 of the platform 2.

As illustrated, the arch-shaped members of the two platforms are preferably made from a U-section member of light material, such as aluminium. As concerns the outer arch-shaped members 4 and 5, the two flanges of the U-section extend inwardly of the arch-shaped member. On the other hand, the arch-shaped members 8 and 9 of the two platforms 1 and 2 have the flanges of the U-section extending outwardly of the arch-shaped member, the distance between the flanges being slightly greater than the distance between the flanges of the U-section of the outer members 4 and 5. Consequently, in each platform, the arch-shaped members may be assembled by a partial insertion of one inside the other as shown.

Whereas the members 5 and 9 of the platform 2 are fixed together, for example by rivets 10, the inner arch-shaped member 8 of the other platform is slidably mounted so as to allow a suitable adjustment of the handle 11 of the push-carriage constituted by the upper end of the member 8. The position of the member 8 may be locked by a locking device 12 described hereinafter.

The outer branches of the arch-shaped members 4 of the platform 1 are slightly shorter than the inner branches thereof and these outer branches are fixed to a transverse bar 6 through two strips 13 which are cranked at about 30° and extend in a vertical plane in parallel directions from the common edges of the platforms 1 and 2. These strips, preferably of stainless steel, are part of a pivot device 3. They are secured by rivets 14, for example, to the corresponding branches of the arch-shaped members 4 and support adjacent their lower end a bracing member or rod 15 on which two wheels 16 are freely rotatable outside the strips 13. The wheels bear against the ground and support the push-carriage and the load which is disposed thereabove when the push-carrige is in use and moved along the ground (FIG. 1). Thus it can be seen that the strips 13 extend downwardly and rearwardly from the side of the platform 1 opposed to the platform 2.

The outer branches of the arch-shaped members 5 of the platform 2 are also shorter than the inner branches and these branches are secured, for example by rivets 17, to pivot plates 18 which are maintained spaced apart by the rod 7 and are part of the pivot device 3.

Each plate 18 has a branch portion 19 which has an aperture at its end for receiving a pivot rivet or pin 20 which is aligned on the axis X—X (FIG. 3). Each arch-shaped member 4 has a notch 21 to permit the pivotal movement of the plate 18.

Each plate 18 also has a heel portion 22 defining at its free end an abutment surface 23 which cooperates with an abutment tab 24 formed on the cranked strip 13. A notch 25 is provided to clear the rod 6 when the platform 2 is unfolded.

FIGS. 2 and 3 in particular show that locking slides 26 are mounted on the two outer branches of the members 4; these slides are capable of engaging over tabs 19 of the pivot plates 18 so as to maintain them in position when the push-carriage is unfolded.

As already mentioned, the arch-shaped member 8 of the platform 1 is slidable so as to regulate the handle of the push-carriage and thus facilitate the utilisation of the latter. To lock the sliding arch-shaped member 8, the aforementioned locking device 12 is arranged in the following manner. One of the flanges (rear flange) of each branch of the member 8 is extended at 27 (FIG. 6) and slightly bent outwardly. A cross-member 28 interconnects the two extensions 27 through rivets 29. A resiliently-yieldable plate 30 extends upwardly and is riveted to the bottom of a recess 31 provided in the cross-member 28.

The opposite edge portion of the plate 30 is secured in the same way to the bottom of a recess 32 formed in a second cross-member 33 which includes adjacent its two ends a stud or the like 34 which is capable of respectively engaging in two series of apertures 35 spaced apart in the facing flanges of the branches of the members 4. Each pair of apertures 35 thus determines a given position of this member 8.

FIGS. 5, 7 and 8 show in detail that the push-carriage has a stand 36 which is pivoted to the intermediate arch-shaped member 9 of the platform 2. This stand is also arch-shaped and constructed from a U-section member and is mounted on the platform 2 at the ends of its two branches by rivets 37 (FIG. 2). Mounted on each side of these rivets are two stop cross-members, the cross-member 38 being fixed to the member 9 and the other cross-member 39 being in the form of a resiliently-yieldable strip and withdrawable. The cross-member 39 is pivoted to one of the branches of the arch-shaped member 9 by a rivet 40 and its opposite end carries a pin 41 which is capable of being introduced in an aperture 42 in the corresponding branch of the arch-shaped member 9. The resilience of the strip 39 ensures that the pin 41 is maintained in the aperture 42.

As shown in FIG. 2, the stand is maintained in its unfolded position by a spring 43 which is hooked to the stand at its lower end and to the cross-member 38 at its upper end. This spring ensures that the stand passes through a dead-centre position in which the spring is extended to its maximum extent, which ensures that the stand is held either in its unfolded or in its folded-up position.

FIG. 1 shows the push-carriage of the invention in its unfolded position of utilisation. It will be observed that in this position the lower portion of the strips 13 is practically in the vertical position so that the load of the push-carriage bears directly on the transverse member or rod 15 so that the forces of the load exerted on the platforms 1 and 2 are distributed roughly equally either side of the rod 15. Consequently, there is a suitable equilibrium and great ease of handling of the push-carriage even with large and heavy loads.

To stow away the push-carriage, it may be folded up completely from its position of utilisation shown in FIG. 1 to the position shown in FIG. 5.

The stand 36 is folded up by first withdrawing the strip 39. For this purpose, the pin 41 is disengaged from the aperture 42 and the strip is turned in such manner as to put it in coincidence with the corresponding branch of the arch-shaped member 9. While holding the push-carriage, the stand is urged in such manner that after having passed through the neutral point of the spring 43 (maximum tension), it is fitted between the branches of the member 9. The strip 39 is then pushed back into position. It will be understood that these operations must also be carried out when, in starting from the stable position shown in FIG. 2, it is desired to roll the push-carriage along (position shown in FIG. 1).

The platform 2 may then be folded up against the platform 1 (FIG. 5) by making it pivot about the axis X—X after having released the tabs 19 from the locking slides 26.

If the arch-shaped member 8 is in the extended position (as shown in FIG. 1) the locking device is rendered inoperative by pulling on the cross-member 33 which causes the plate 30 to bend and disengage the pins 34 from the apertures 35. Having in this way unlocked the member 9 it can be slid downwardly until the locking device has reached the lower pair of apertures 35.

Note that the travel of the member 8 is limited by a small bar 44 which is mounted on the upper end of the arch-shaped members 4 and co-operates with two lugs 45 fixed to the arch-member 8.

FIG. 2 shows that the completely unfolded position is reached upon the contact of the abutment 24 with the abutment surfaces 23 of the heel portions 22 of the plates 18.

It can be seen from the foregoing description that the invention provides a load-carrying push-carriage which is very easy to handle and is capable of being completely folded up and yet is very strong. It can thus support very diverse loads such as a chair for a baby, a parcel or package, a market bag and the like.

Having now described my invention what I claim as new and desire to secure by Letters Patent is:

1. A foldable load-carrying push-carriage capable of being put selectively in a folded up position and an unfolded position and comprising a first platform and a second platform, each platform having a transverse edge, a pivot device interconnecting the platforms for relative pivotal movement about an axis adjacent said transverse edges of the platforms, holding means carried by the first platform for pushing and handling the push-carriage, two cranked strips integral with the first platform, two rotatable wheels respectively mounted on the strips adjacent opposite ends of the transverse edges, the strips extending in parallel directions downwardly and rearwardly of the first platform on a side of the first platform opposed to the second platform when the push-carriage is in said unfolded position and rests on the ground in a stable position, the wheels being mounted on lower end portions of the strips, said strips being part of said pivot device, the pivot device comprising two pivot plates integral with the second platform, each plate having an arm portion which is pivoted to the corresponding cranked strip at a point located beyond the crank of the strip with respect to said lower end portion of the strip, and a heel portion, an abutment on each strip, the heel portion of each plate being capable of bearing, in the unfolded position of the push-carriage, against the abutment of the corresponding strip.

2. A push-carriage as claimed in claim 1, comprising locking means for locking said plates in position when said heel portions bear against said abutments.

3. A foldable load-carrying push-carriage capable of being put selectively in a folded up position and an unfolded position and comprising a first platform and a second platform, each platform having a transverse edge, a pivot device interconnecting the platforms for relative pivotal movement about an axis adjacent said transverse edges of the platforms, holding means carried by the first platform for pushing and handling the push-carriage, two cranked strips integral with the first platform, two rotatable wheels respectively mounted on the strips adjacent opposite ends of the transverse edges, the strips extending in parallel directions downwardly and rearwardly of the first platform on a side of the first platform opposed to the second platform when the push-carriage is in said unfolded position and rests on the ground in a stable position, the wheels being mounted on lower end portions of the strips, said first platform comprising three adjacent arch-shaped members having branches which are interconnected, the intermediate arch-shaped member of said three arch-shaped members acting as a handle and being slidable with respect to the two adjacent arch-shaped members, there being provided a locking device comprising a first cross-member integral with the slidable arch-shaped member and interconnecting lower end portions of the branches of the slidable arch-shaped member, a resiliently yieldable plate mounted on said first cross-member and a second movable cross-member, a series of apertures formed in one of the arch-shaped members adjacent the intermediate arch-shaped member, a pin carried by the movable cross-member and capable of being inserted in any selected one of said apertures so as to fix a selected position of the slidable arch-shaped member with respect to the adjacent arch-shaped members.

* * * * *